United States Patent [19]

Malmquist et al.

[11] Patent Number: 5,332,959
[45] Date of Patent: Jul. 26, 1994

[54] CONTROL OF CONSTANT SPEED AND CONSTANT MAXIMUM TEMPERATURE OF A GAS TURBINE

[75] Inventors: Anders Malmquist, Täby; Johnny Rehn, Höllviken, both of Sweden

[73] Assignee: Asea Brown Boveri AB, Västeråe, Sweden

[21] Appl. No.: 1,660

[22] Filed: Jan. 7, 1993

[30] Foreign Application Priority Data

Jan. 29, 1992 [SE] Sweden .................... 9200243-5

[51] Int. Cl.⁵ ........................................ F02C 9/00
[52] U.S. Cl. ........................... 322/14; 290/40 R; 60/39.281
[58] Field of Search .......... 322/14, 15, 22, 23, 322/28, 29, 33, 34; 290/40 R, 52; 60/39.161, 39.281

[56] References Cited

U.S. PATENT DOCUMENTS

| | | | |
|---|---|---|---|
| 3,174,284 | 3/1965 | McCarthy | 60/39.161 |
| 3,911,285 | 10/1975 | Yannone et al. | 322/14 X |
| 4,188,181 | 2/1980 | Johnson et al. | 60/39.281 |
| 4,219,738 | 8/1980 | Griesinger | 290/40 R |
| 4,242,592 | 12/1980 | Yannone et al. | 290/40 R |
| 4,321,791 | 3/1982 | Carroll | 60/39.281 X |
| 4,529,887 | 7/1985 | Johnson | 290/40 R |
| 4,995,232 | 2/1991 | Sutton | 60/39.281 X |

Primary Examiner—Kristine L. Peckman
Attorney, Agent, or Firm—Watson Cole Grindle & Watson

[57] ABSTRACT

A device for control of power (P) generated by a gas turbine (1) which drives an electric generator (2) with a rectifier (3) connected thereto, comprises a control member (6) adapted to control the fuel supply of the gas turbine (1) in such a way that the inlet temperature (T) of the gas turbine is caused to correspond, at least substantially, to a predetermined value (TR). A direct-voltage network (4) with controllable voltage (U) is connected to the rectifier (3) and the control member (6) generates a voltage control signal (URs) which is supplied to the direct-voltage network (4).

28 Claims, 4 Drawing Sheets

CONTROL OF CONSTANT SPEED AND CONSTANT MAXIMUM TEMPERATURE OF A GAS TURBINE

TECHNICAL FIELD

The present invention relates to a method for control power generated by a gas turbine which drives an electric generator with a rectifier connected to the generator, as well as a device for carrying out the method.

The device comprises a direct-voltage network, connected to the rectifier, with controllable voltage.

BACKGROUND ART

For generation of electric power both in tractional and in stationary applications, it is known to use gas turbines for driving electric generators. In applications with a varying power requirement, however, gas turbines exhibit certain disadvantages in that, at partial load, their efficiency is greatly deteriorated while at the same time the contents of environmentally harmful constituents in the exhaust gases are increased. It is also known that these disadvantages can be avoided by means of a control adapted to maintain the inlet temperature of the gas turbine at an even and high value. Thus, a system has been suggested where the guide vanes of the compressor in dependence on the load requirement are oriented such that the inlet temperature of the turbine is maintained substantially constant [Bulletin of the Royal Academy of Belgium; 5th Seiries, Volume XLI, 1955, A. Jaumotte: Control of Constant Speed and Constant Maximum Temperature of a Gas Turbine with Open Circuit on One Shaft]. The suggested solution means a mechanically complicated design owing to the fact that the generator driven by the gas turbine is connected to a stiff alternating-voltage network and the speed of the gas turbine thus bound to the frequency thereof. Therefore, particularly in applications where the speed of the gas turbine can be allowed to vary, a mechanically simpler solution is desirable.

SUMMARY OF THE INVENTION

The invention aims to provide a method of the kind described in the introductory part, which, particularly for a gas turbine with a stationary stator part, allows a control of its power while maintaining a high efficiency and minimal emissions of harmful exhaust gases, as well as a device for carrying out the method.

According to the invention, this is achieved by controlling the fuel supply of the gas turbine in such a way that the inlet temperature of the gas turbine is caused to correspond, at least substantially, to a predetermined value and by connecting to the rectifier a direct-voltage network with controllable voltage. By variation of the voltage of the direct-voltage network, the power of the gas turbine can thereby be controlled.

Advantageous further developments of the invention will be clear from the following description and claims.

BRIEF DESCRIPTION OF THE DRAWINGS

The invention will be explained in greater detail by describing embodiments with reference to the accompanying drawings, wherein.

DESCRIPTION OF THE PREFERRED EMBODIMENTS

The following description relates both to the method and to the device.

Figure 1:
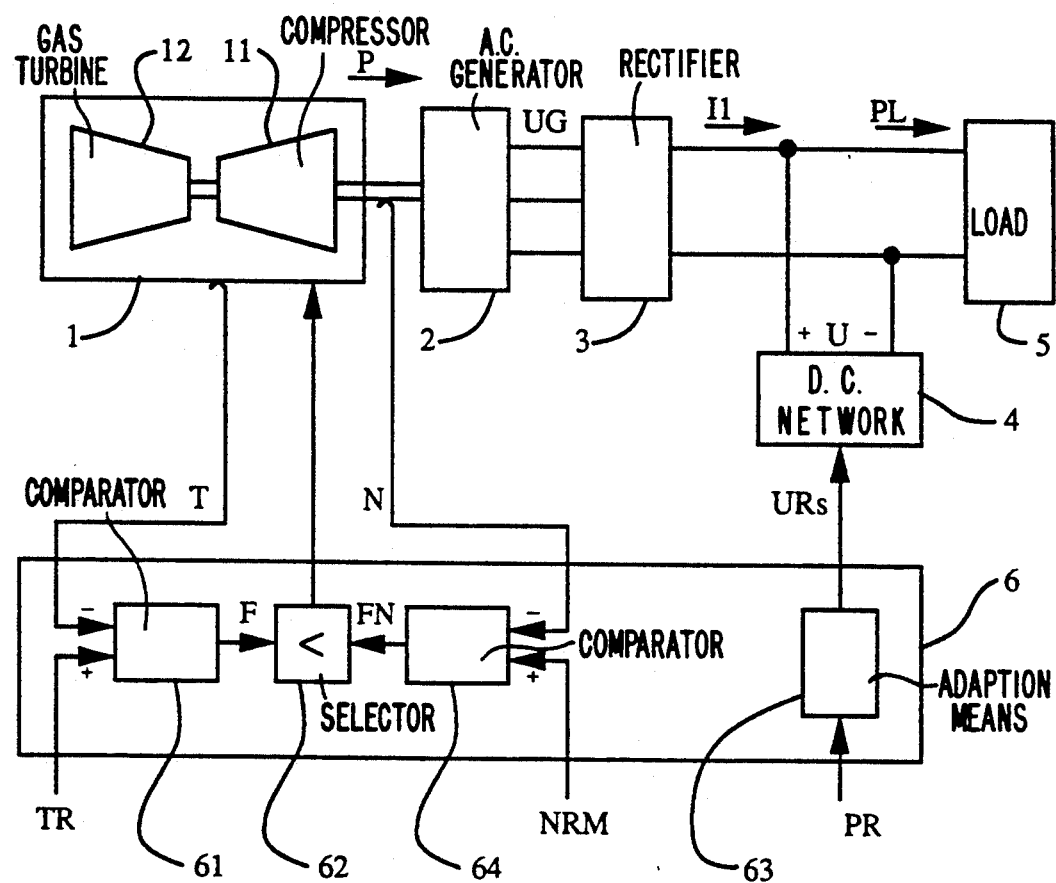
FIG. 1 shows in the form of a block diagram an embodiment of the invention.
Figure 2:
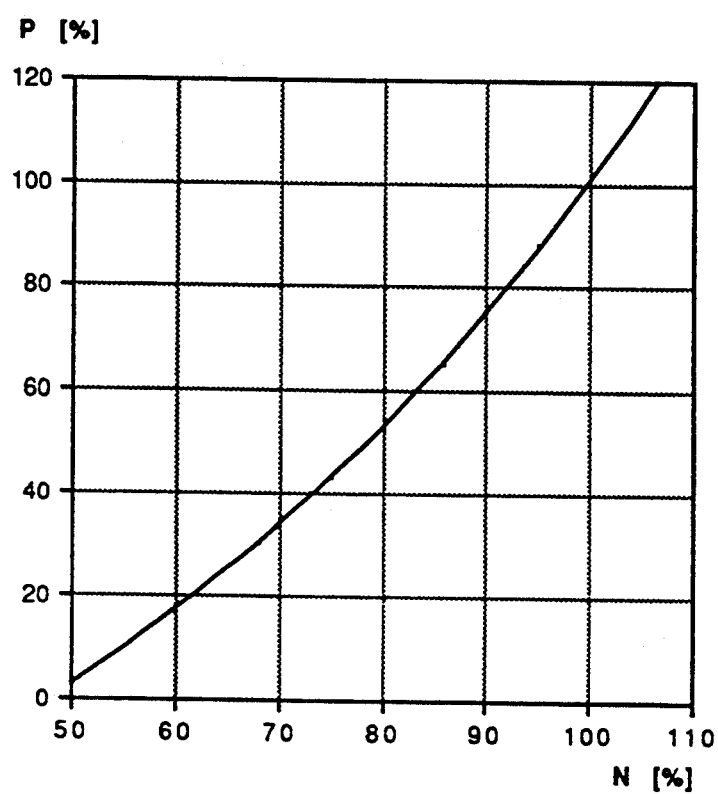
FIG. 2 shows a relationship between the output power of a gas turbine and its speed at constant inlet temperature.

FIG. 1 shows a single-shaft gas turbine unit 1 with a compressor 11 and a turbine 12. A permanent-magnetized three-phase synchronous generator 2 is directly connected to the shaft of the gas turbine unit, and to the terminals of the generator there is connected a rectifier 3. A direct-voltage network 4 with a controllable voltage U as well as a load object 5 are connected to the direct-voltage side of the rectifier. The gas turbine delivers the power P and the load object is supplied with the power PL. The inlet temperature T of the gas turbine is sensed in a manner known per se by means of a thermocouple and is compared in a first comparison means 61, arranged in a control member 6, with a predetermined value TR. In dependence on the difference between this value and the current value of the inlet temperature, the first comparison means forms a first output signal F which, via a selector 62, is supplied to the system for fuel supply of the gas turbine (this system not being shown in the figure) and which, in a manner known per se, influences this system such that the fuel supply will become dependent on the magnitude of the first output signal F. The selector 62 is adapted to select that of the first control signal and a second control signal FN, which will be explained below, which represents the lowest fuel supply. By arranging the first comparison means such that an increasing value of the inlet temperature produces a decreasing fuel supply, the inlet temperature of the gas turbine will thereby assume a value which at least substantially corresponds to the predetermined value TR. A fundamental relationship between the power generated by the gas turbine and the speed of the gas turbine at constant inlet temperature is shown in FIG. 2, where on the horizontal axis the speed N is plotted as a percentage of the rated speed and on the vertical axis the power P is plotted as a percentage of the rated power.

The generator 2 generates an alternating voltage UG, the frequency and amplitude of which are dependent on the speed N. The alternating voltage is supplied to the rectifier 3 which at its output assumes a rectifier voltage, the amplitude of which is proportional to the alternating voltage UG. Current can flow through the rectifier only if the voltage U of the direct-voltage network 4 is less than the no load value of the rectifier voltage. The amplitude of the current is determined by the difference between the alternating voltage and the voltage of the direct-voltage network and by the impedances of the generator and the rectifier, and the power transmitted through the rectifier is determined by the product of the current and the voltage of the direct-voltage network. In the event that this power should be greater than that generated by the gas turbine, the speed of the gas turbine will decrease, which leads to the alternating voltage decreasing and hence, provided that the voltage of the direct-voltage network is at least temporarily maintained unchanged, also the power transmitted through the rectifier. A stationary working point is achieved when the speed has decreased to a value at which the power, generated in accordance with the relationship according to FIG. 2, corresponds to the power transmitted through the rectifier. If, conversely, the power transmitted through the rectifier should be less than the power generated by the gas turbine, the speed of the gas turbine will increase, which leads to the alternating voltage increasing and hence, provided that the voltage of the direct-voltage network is at least temporarily maintained unchanged, also the power transmitted through the rectifier. A stationary working point is achieved when the speed has increased to a value at which the power, generated in accordance with the relationship according to FIG. 2, corresponds to the power transmitted through the rectifier. On the basis of a stationary working point, by decreasing the voltage of the direct-voltage network, the power transmitted through the rectifier may, during a transient, increase, whereby the speed of the gas turbine and hence its generated power will decrease, as described above, and conversely, by increasing the voltage of the direct-voltage network, the power transmitted through the rectifier may, during a transient , decrease, whereby the speed of the gas turbine and hence its generated power will increase, as described above.

By maintaining the inlet temperature of the gas turbine at an at least substantially constant value, its power can thus be controlled by variation of the voltage U of the direct-voltage network. In this way, the speed of the gas turbine will vary in accordance with the relationship shown in FIG. 2, and it proves that between the voltage U of the direct-voltage network and the power generated by the gas turbine there prevails a relationship which is at least approximately linear over a practicable speed interval, which is of the order of magnitude of 40–100% of the rated speed.

The direct-voltage network is adapted to vary its voltage U in dependence on a voltage control signal URs. This is formed by supplying a reference value for desired power PR to an adaptation means 63 arranged in the control member 6, the output signal of the adaptation means being supplied to the direct-voltage network.

To prevent the speed of the gas turbine from exceeding the maximally allowed speed in the event of a fault in the plant, a monitoring of the speed is normally required. The speed is sensed in some manner known per se, in this case by measuring the frequency of t, he alternating voltage UG generated by the generator, and is compared in a second comparison means 64 , arranged in the control member 6, with a predetermined value NRM. The second comparison means 64 is adapted, in the event that the speed N exceeds the predetermined value NRM, to form a second control signal FN in dependence on the difference between the speed N and the predetermined value NRM, and to supply to the selector 62 this second control signal.

Figure 3:
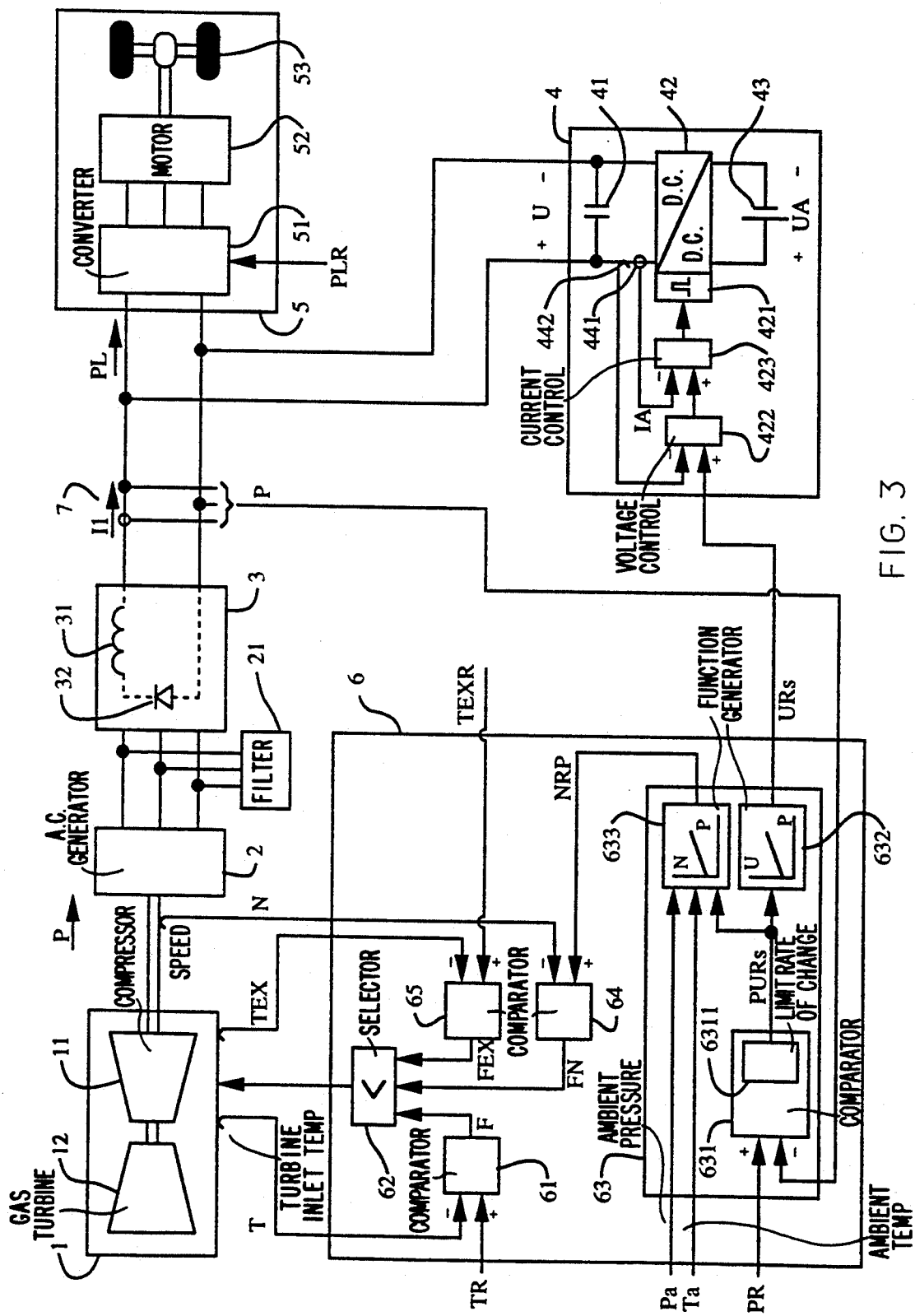
FIG. 3 shows in the form of a block diagram a further embodiment of the invention.

An advantageous embodiment of the invention is shown in FIG. 3 which illustrates an application in which the power generated by the gas turbine is part of a system for propelling a vehicle. For the purpose of improving the waveform of the voltage and current through the rectifier, generated by the generator, a filter 21 comprising a capacitor bank is connected to the alternating-voltage terminals of the generator 2 and a smoothing reactor 31 is comprised in the rectifier. For clarification, the unidirectional function of the rectifier has been marked by a diode 32. The direct-voltage network 4 comprises a capacitive element 41, a direct-voltage converter 42 controllable by means of a control pulse device 421, and an accumulator 43 of, for example, lead or nickel-cadmium type. The direct-voltage converter is adapted to convert, in a manner known per se, the voltage UA of the accumulator to a voltage U across the capacitive element, which voltage is dependent on the supplied voltage control signal URs. It is advantageous to accomodate in the direct-voltage converter, in a manner known per se, a voltage controller 422 for controlling the voltage U with a current controller 423, subordinate to the voltage controller, for controlling the current IA through the direct-voltage converter. In this way, the rate of change of the voltage U, which is dependent on the current to the capacitive element 41 flowing through the direct-voltage converter, can be limited in a simple manner by limiting the magnitude of the output signal from the voltage controller 422, which output signal constitutes reference value for the current controller. The current IA and the voltage U are sensed by a current measuring device 441 and a voltage measuring device 442.

The load object 5 comprises a converter 51 connected to the direct-voltage network 4 and a motor 52 which is connected to the alternating-voltage side of the converter and which is adapted to drive a vehicle 53, only outlined in the figure. The power PL supplied to the converter is controlled by a reference value for desired power PLR, which reference value is supplied to the converter. In one embodiment, the accumulator voltage UA may be 120 V, the direct-voltage converter may deliver a voltage U of up to 420 V, and the maximum speed of the gas turbine may be 90,000 r.p.m at which speed it delivers a power of 40 kW.

The first comparison means 61 is designed as a controller with at least one of the following characteristics: proportional, integrating and derivative characteristic, and the predetermined value TR of the inlet temperature is fixed and based on the design of the gas turbine. It is, however, advantageous to arrange the control member such that the predetermined value TR can be temporarily increased in order to increase the available power output from the gas turbine for a short period. The power P generated by the gas turbine is sensed by measuring the current I1 flowing through the rectifier and the voltage U of the direct-voltage network by means of a measuring device 7 provided for the purpose. In order to obtain an accurate control of the power P of the gas turbine, the sensed value of the power is fed back to a third comparison means 631 arranged in the control member 6 for comparison with a reference value for the desired power PR. This third comparison means, which can advantageously be designed as a controller with at least one of the following characteristics: proportional, integrating and derivative characteristic, is adapted, in dependence on the difference between the desired power PR and the measured power P, to form a third control signal PURs. It is advantageous, but not necessary, as illustrated in FIG. 3, to supply the third control signal to a first function-forming means 632 for forming a predetermined relationship between the power P and the voltage U and arrange the output signal from this first junction-forming means to be supplied to the direct-voltage converter 42. The relationship between the power P and the voltage U is determined based on the given design the gas turbine, the generator, the rectifier, and the direct-voltage network. Alternatively, the third control signal PURs may be adapted to be directly supplied to the direct-voltage converter. The third comparison means may comprise means 6311, arranged in a manner known per se, for limiting the rate of change for the third control signal PURs and hence also for the voltage control signal URs. By varying the reference value for the desired power PR, the power P of the gas turbine can thus be controlled rapidly and accurately in this way.

In case of a fast and considerable reduction of the voltage U of the direct-voltage network, the current through the rectifier will, during a transient, assume high values since the speed of the gas turbine immediately after the voltage reduction remains unchanged. The duration of the transient is determined by the system for maintaining constant the inlet temperature of the gas turbine, and for reducing the stress of the overcurrents on the generator and the rectifier it is advantageous to temporarily replace this system by a speed control of the gas turbine to achieve a fast limitation of the fuel supply of the gas turbine. To this end, the third control signal PURs is supplied to a second function-forming means 633 for forming a predetermined relationship between the power P and the speed N, and the output signal from this second function-forming means, corresponding to a speed NRP, is adapted to be supplied to the second comparison means 64. The second comparison means 64 is adapted, in the event the speed N exceeds the speed NRP, to form the second control signal FN in dependence on the difference between the speed N and the speed NRP. It is advantageous in this case to form the second comparison means 64 as a controller with at least one of the following characteristics: proportional, integrating and derivative characteristic. The relationship between the power P and the speed N is determined based on the given design of the gas turbine. The output signal from the second function-forming means is limited to a value corresponding to the predetermined value NRM of the maximally allowed speed of the gas turbine.

The relationship between power P and speed N which applies to a certain gas turbine is dependent on the pressure Pa as well as the temperature Ta of the ambient atmosphere in such a way that for a given speed the power decreases with increasing ambient temperature and decreasing ambient pressure. In order to obtain a better utilization of the gas turbine, it is therefore advantageous, in dependence on measured values of these parameters, to modify the relationship between the power P and the speed N formed by the second function-forming means 633. This is illustrated in FIG. 3 by supplying measured values of the ambient pressure Pa and the ambient temperature Ta to the second function-forming means 633.

At very low power outputs, about 15–20% of rated power, the temperature drop across the turbine part of the gas turbine is reduced, which, when controlling on a constant inlet temperature, leads to an increase of the exhaust gas temperature TEX. It may therefore be advantageous to limit the fuel supply of the gas turbine in dependence on its exhaust gas temperature. The exhaust gas temperature is sensed by means of a thermocouple and is compared with a predetermined value TEXR in a fourth comparison means 65 designed as a controller with at least one of the following characteristics: proportional, integrating and derivative characteristic. The fourth comparison means 65 is adapted, in the event that the exhaust gas temperature TEX exceeds the predetermined value TEXR, to form a fifth control signal FEX in dependence on the difference between the exhaust gas temperature TEX and the predetermined value TEXR, and to supply this control signal to the selector 62. The selector 62 is thereby adapted to select that of the first control signal F, the second control signal FN and the fifth control signal FEX which corresponds to the lowest fuel supply.

The described system for propelling tile vehicle makes it possible to supply a desired part of the power P generated by the gas turbine to both the load object 5 and the direct-voltage network 4 for charging the accumulator 43. In similar manner, power may be brought from the accumulator to the converter 51, and by arranging the converter for feedback of energy from the motor 52, the accumulator can also be charged by utilizing mechanical energy absorbed from the vehicle. Thus, the system also makes possible propulsion of the vehicle with the gas turbine shut off, in which case the voltage U of the direct-voltage network is advantageously controlled to its maximum value by supplying a control signal (not shown in the figure) to the direct-voltage converter. When necessary, the gas turbine is started by means of a starting converter (not shown in the figure) supplied by the direct-voltage network.

Figure 4:
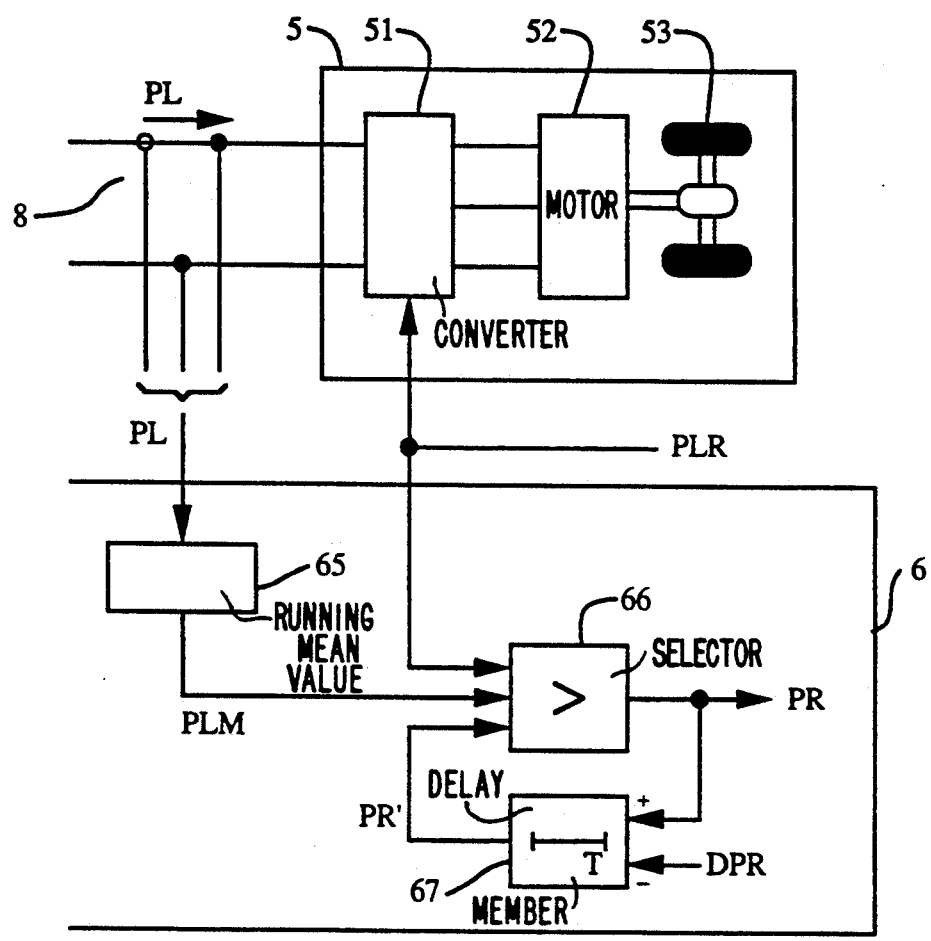
FIG. 4 shows in the form of a block diagram one way forming a desired value of the power of the gas turbine, in an embodiment according to FIG. 3.

FIG. 4 illustrates how the desired value PR of power generated by the gas turbine is formed in an advantageous manner by means of members, arranged in the control member 6, for the purpose of achieving good running properties in operation of the vehicle, as well as an even energy level in the accumulator. The power PL supplied to the converter is sensed by means of a measuring device 8 and is supplied to a mean-value forming member 65 adapted to generate as output signal a running mean value PLM of the power PL supplied to the converter, the running mean value being formed over a predetermined period of time. This running mean value PLM as well as the reference value PLR for the instantaneously desired supplied power to the converter are supplied to a selector 66 adapted to select the greatest of the signals supplied to the selector. The output signal of the selector 66 is then allowed to constitute the desired value PR of power generated by the gas turbine. In this way, the mean power consumption of the vehicle will be generated by the gas turbine while at the same time a power requirement exceeding this mean power consumption instantaneously influences the power desired by the gas turbine. In order adapt the power generation of the gas turbine to a decreasing requirement, the current value PR of power desired by the gas turbine is further sensed and supplied, reduced by a predetermined amount DPR, to a delay member 67 adapted to generate a time lag T. The delay member 67 thereby generates, at its output, a value PR' corresponding to the current value PR of power desired by the gas turbine, decreasing by a predetermined rate of change, which value is supplied to the selector 66.

The invention is not limited to the embodiments shown but a plurality of modifications are feasible within the scope of the inventive concept. The invention can advantageously be applied to stationary applications, such as local power stations and the direct-voltage network may, for example, still within the scope of the inventive concept, comprise a flywheel unit with devices, known per se, associated therewith for variation of the voltage U or of a controllable rectifier connected to an alternating voltage network. Also, the generator may be designed with a different number phases and/or magnetization systems and the power be measured in alternative, known ways. The limiting interference with the fuel supply of the gas turbine, which is dependent on the respective speeds and exhaust gas temperature of the gas turbine, can alternatively be achieved by a corresponding limitation of the predetermined value TR of the inlet temperature of the gas turbine. Although the invention makes possible a simple control of a turbine with a stationary stator part, it is, of course, also advantageous to apply to control of gas turbines with adjustable guide vanes. The functions of the control member 6 carl advantageously be performed in a programmed microprocessor, but may also, wholly or partially, be performed with other, for example analog, components.

We claim:

1. A method for control of power generated by a gas turbine which drives an electric generator with a rectifier connected thereof, a direct-voltage network with a controllable voltage being connected to said rectifier, the gas turbine having a fuel supply and a temperature sensing means for sensing the inlet temperature of the gas turbine, comprising the steps of:
sensing said inlet temperature;
controlling said fuel supply so that said inlet temperature is caused to substantially correspond to a predetermined value; and
varying said controllable voltage to control said power.

2. A method according to claim 1, wherein the direct-voltage network comprises a direct-voltage converter and said step of varying includes the step of controlling said direct-voltage converter.

3. A method according to claim 1, further comprising the step of controlling the rate of change of said voltage.

4. A method according to claim 1, wherein the gas turbine has a temperature sensing means for sensing the exhaust temperature thereof and said step of controlling further comprises the steps of sensing said exhaust temperature; and limiting said fuel supply in dependence on a predetermined value thereof.

5. A method according to claim 1, wherein said step of varying includes the step of generating said voltage in dependence on a predetermined relationship between said power and said voltage.

6. A method according to claim 1, wherein the gas turbine has a speed sensing means for sensing the speed thereof and said step of controlling said fuel supply includes the steps of sensing said speed; and limiting said fuel supply in dependence between said speed and a speed corresponding to a value generated in dependence on a predetermined relationship between said power and said speed of the gas turbine.

7. A method according to claim 6, wherein said power is generated in an environment having an ambient pressure and an ambient temperature and said step of controlling includes the steps of sensing at least one of said ambient pressure and said ambient temperature; and modifying said predetermined relationship between said power and said speed of the gas turbine in dependence on at least one of said ambient pressure and said ambient temperature.

8. A method according to claim 1, wherein said step of varying includes the steps of sensing said power; and varying said voltage in dependence on a deviation of said power from a desired power.

9. A method according of claim 8, wherein the gas turbine is located on a vehicle, at least a part of said power is transmitted to a load, said load comprising a controllable converter, connected to said rectifier, a motor for propulsion of said vehicle being connected to said converter, further comprising the step of selecting said desired power as the greatest of: (1) a running mean value over a predetermined period of time of said part of said power transmitted to said load; (2) an instantaneously desired value of said part of said power transmitted to said load; or (3) a value corresponding to a current value of power desired from the gas turbine, which value is decreased at a predetermined rate of change.

10. A method for control of power generated by a gas turbine which drives an electric generator with a rectifier connected thereto, a direct-voltage network with a controllable voltage being connected to said rectifier, said direct-voltage network comprising a direct-voltage converter for controlling the voltage of said network, the gas turbine having a fuel supply and a temperature sensing means for sensing the inlet temperature of the gas turbine, comprising the steps of:
sensing said inlet temperature;
controlling said fuel supply so that said inlet temperature is caused to substantially correspond to a first predetermined value; and
varying said controllable voltage to control said power.

11. A method according to claim 10, wherein the gas turbine has a temperature sensing means for sensing the exhaust temperature thereof and wherein said step of controlling said fuel supply includes the steps of sensing said exhaust temperature; and limiting said fuel supply in dependence on the difference between said exhaust temperature and a second predetermined value.

12. A method according to claim 10, wherein said step of varying includes the step of generating said voltage in dependence on a predetermined relationship between said power and said voltage.

13. A method according to claim 12, wherein the gas turbine has a speed sensing means for sensing the speed thereof and said step of controlling said fuel supply includes the steps of sensing said speed; and limiting said fuel supply in dependence between said speed and a speed corresponding to a value generated in dependence on a predetermined relationship between said power and said speed of the gas turbine.

14. A method according to claim 12, wherein said step of varying includes the steps of sensing said power; and varying said voltage in dependence on a deviation of said power from a desired power.

15. A device for control of power generated by a gas turbine which drives an electric generator with a rectifier connected thereto, comprising a control member and a direct-voltage network with a controllable voltage, said network being connected to said rectifier, the gas turbine having a fuel supply and a temperature sensing means for sensing the inlet temperature thereof, wherein the control member controls said fuel supply so that said inlet temperature is caused to substantially correspond to a first predetermined value and generates a voltage control signal to control said voltage of said direct-voltage network.

16. A device according to claim 15, wherein said network comprises a direct-voltage converter for controlling the voltage of said network, said converter being controllable in dependence on said voltage control signal.

17. A device according to claim 15, further comprising means for limiting the rate of change of said voltage to a predetermined level.

18. A device according to claim 15, wherein the gas turbine has a temperature sensing means for sensing the exhaust temperature thereof, and wherein the control member comprises a comparison means for limiting said fuel supply in dependence on a difference between said exhaust temperature and a second predetermined value.

19. A device according to claim 15, wherein the control member comprises function-forming means for generating said voltage control signal in dependence on a predetermined relationship between said power and said voltage.

20. According to claim 15, wherein the gas turbine has a speed sensing means for sensing the speed thereof and wherein the control member comprises a function-forming means for generating, in dependence on a predetermined relationship between said power and said speed of the gas turbine, an output signal corresponding to a speed, and a comparison means for limiting said fuel supply in dependence on a difference between said speed of the gas turbine and said speed corresponding to said output signal.

21. A device according to claim 20, wherein said power is generated in an environment having an ambient pressure and an ambient temperature and wherein said function-forming means modifies said predetermined relationship between said power and said speed of the gas turbine in dependence on at least one of said ambient pressure and said ambient temperature.

22. A device according to claim 15, wherein said control member comprises a comparison means for sensing said power and generating said voltage control signal in dependence on a deviation of said power from a desired power.

23. A device according to claim 22, wherein the gas turbine is located on a vehicle, at least part of said power is transmitted to a load, said load comprising a controllable converter, connected to said rectifier, a motor for propulsion of said vehicle being connected to said converter, wherein said control member comprises a mean-value forming means for generating an output signal equal to the running mean value over a predetermined period of time of said part of said power transmitted to said load, a delay means for generating an output signal corresponding to a current value of power desired from the gas turbine, which value is decreased at a predetermined rate of change, and a selector for selecting, as a reference value for the power desired from the gas turbine, the greatest of: (1) said output signal from said mean-value forming means; (2) an instantaneously desired value of said part of said power transmitted to said load; or (3) said output signal from said delay means.

24. A device for control of power generated by a gas turbine which drives an electric generator with a rectifier connected thereof, comprising a control member and a direct-voltage network with a controllable voltage, said network being connected to said rectifier, said direct-voltage network comprising a direct-voltage converter for controlling the voltage of said network, the gas turbine having a fuel supply and a temperature sensing means for sensing the inlet temperature thereof, wherein the control member controls said fuel supply so that said inlet temperature is caused to substantially correspond to a predetermined value and generates a voltage control signal to control said direct-voltage converter.

25. A device according to claim 24, wherein the gas turbine has a temperature sensing means for sensing the exhaust temperature and the control member comprises a comparison means for limiting said fuel supply in dependence on a difference between said exhaust temperature and a predetermined value thereof.

26. A device according to claim 24, wherein the control member comprises a function-forming means for generating said voltage control signal in dependence on a predetermined relationship between said power and said voltage.

27. A device according to claim 26, wherein the gas turbine has a speed sensing means for sensing the speed thereof and wherein the control member comprises a function-forming means for generating, in dependence on a predetermined relationship between said power and said speed of the gas turbine, an output signal corresponding to a speed, and a comparison means for limiting said fuel supply in dependence on a difference between said speed of the gas turbine and said speed corresponding to said output signal.

28. A device according to claim 26, wherein the control member comprises a comparison means for sensing said power and generating said voltage control signal in dependence on a deviation of said power from a desired power.

* * * * *